United States Patent
Ferraiolo

(10) Patent No.: US 8,142,105 B2
(45) Date of Patent: Mar. 27, 2012

(54) WAVE-MOTION REDUCING STRUCTURE

(75) Inventor: Francesco Ferraiolo, Ca' de' Fabbri (IT)

(73) Assignee: Officine Maccaferri S.p.A., Bologna (IT)

(*) Notice: Subject to any disclaimer, the term of this patent is extended or adjusted under 35 U.S.C. 154(b) by 302 days.

(21) Appl. No.: 12/312,161

(22) PCT Filed: Oct. 31, 2007

(86) PCT No.: PCT/IB2007/054423
§ 371 (c)(1), (2), (4) Date: Apr. 28, 2009

(87) PCT Pub. No.: WO2008/056304
PCT Pub. Date: May 15, 2008

(65) Prior Publication Data
US 2010/0047018 A1 Feb. 25, 2010

(30) Foreign Application Priority Data
Nov. 6, 2006 (IT) .............................. BO2006A0754

(51) Int. Cl.
*E02B 3/04* (2006.01)
(52) U.S. Cl. .......................................... 405/25; 405/32
(58) Field of Classification Search ............... 405/21–32
See application file for complete search history.

(56) References Cited

U.S. PATENT DOCUMENTS

| | | | | |
|---|---|---|---|---|
| 346,140 A | * | 7/1886 | Bates | 405/21 |
| 799,708 A | * | 9/1905 | Boyce | 405/21 |
| 2,014,116 A | * | 9/1935 | Powers | 405/23 |
| 2,967,398 A | | 1/1961 | Smith | |
| 3,851,476 A | * | 12/1974 | Edwards | 405/25 |
| 3,892,075 A | * | 7/1975 | Tibbett | 405/28 |
| 3,913,333 A | | 10/1975 | Hubbard | |
| 4,490,071 A | * | 12/1984 | Morrisroe | 405/24 |
| 4,818,141 A | * | 4/1989 | Rauch | 405/30 |
| 4,913,595 A | * | 4/1990 | Creter et al. | 405/30 |
| 5,123,780 A | * | 6/1992 | Martinsen | 405/30 |
| 5,176,468 A | * | 1/1993 | Poole | 405/23 |
| 5,795,099 A | * | 8/1998 | Parker | 405/28 |
| 5,795,835 A | | 8/1998 | Bruner et al. | |
| 5,899,632 A | * | 5/1999 | Martin | 405/25 |
| 5,924,820 A | | 7/1999 | Creter | |

FOREIGN PATENT DOCUMENTS

JP 59-008815 A 1/1984

OTHER PUBLICATIONS

International Search Report and Written Opinion dated Mar. 5, 2008.

* cited by examiner

*Primary Examiner* — Tara Mayo-Pinnock
(74) *Attorney, Agent, or Firm* — Flynn, Thiel, Boutell & Tanis, P.C.

(57) ABSTRACT

A wave-motion reducing structure comprises wave-motion reducing means (30) suitable for being laid on a coastal bed and restraining means (20, 22) suitable for restraining the wave-motion reducing means on the coastal bed. The wave-motion reducing means (30) are arranged so as to be inclined, in use, against the direction of the sea current which strikes them. A wave-motion reducing system comprises a plurality of wave-motion reducing structures arranged in a row lengthwise and in a manner such that the wave-motion reducing means (30) adopt a substantially parallel configuration and oppose the motion of the current.

14 Claims, 2 Drawing Sheets

WAVE-MOTION REDUCING STRUCTURE

BACKGROUND OF THE INVENTION

The present invention relates to the field of wave-motion reducing structures and, more particularly, to a wave-motion reducing structure and to a wave-motion reducing system comprising the structure.

As is known, erosion in progress on coastlines often requires the implementation of measures to prevent such processes. Known structures that are used for resisting erosion, such as breakwaters or groynes, may on the one hand bring advantages in the beach front region but, on the other hand, give rise to erosion processes at the bases of the structures, in the lateral areas, and in the spaces between the structures. Moreover, known structures cause so-called "rip" currents or "undertows", particularly in the direction away from the land towards the open sea, which are damaging to coasts. Another disadvantage of these structures is therefore the need for constant maintenance and refilling works which are expensive and impose a burden on the funds of bodies responsible for coastal maintenance.

BRIEF SUMMARY OF THE INVENTION

The object of the present invention is to solve the problems of the prior art by providing a wave-motion reducing structure and system the use of which achieves not only a substantial reduction in wave motion but, in addition, a more homogeneous redistribution of the energy of the sea current in the surrounding areas, thus safeguarding the integrity of coasts and extending the useful life of coastal refilling or reconstruction operations.

A further object of the present invention is to provide a system which affords maximum safety with regard to bathing conditions on the adjacent beach when in use on a coast. Another object is to ensure effective damping of the wave motion in the long term without requiring exceptional maintenance to the system or to the structures of which the system is composed.

A further object of the present invention is to reduce the management and maintenance costs of a wave-motion reducing system in comparison with known solutions.

To achieve the objects indicated above, the subject of the invention is a wave-motion reducing structure and a wave-motion reducing system as described in the appended claims.

One of the main advantages of the present invention is that of reducing the energy of the wave motion without damaging the original structure of the sea bed, in particular, by damping transverse and lateral currents and preventing the raising of the waterline or "set up" line level, thus preventing erosion and modification of the shape of the coastline.

The structure and the system according to the invention advantageously achieve an optimal reduction in the energy of the wave motion when combined with anti-erosion filters, so that coast refilling operations can be carried out to re-establish the eroded beach in an enduring manner.

BRIEF DESCRIPTION OF THE DRAWINGS

Further characteristics and advantages will become clear from the following detailed description relating to the appended drawings which are provided purely by way of non-limiting example and in which.

DETAILED DESCRIPTION OF THE PREFERRED EMBODIMENTS

With reference now to the drawings, a wave-motion reducing structure, generally indicated 10, comprises wave-motion reducing means, for example, but in non-limiting manner, at least one panel 30, and restraining means which are particularly suitable for restraining the wave-motion reducing means on a coastal bed in use.

Figure 1:
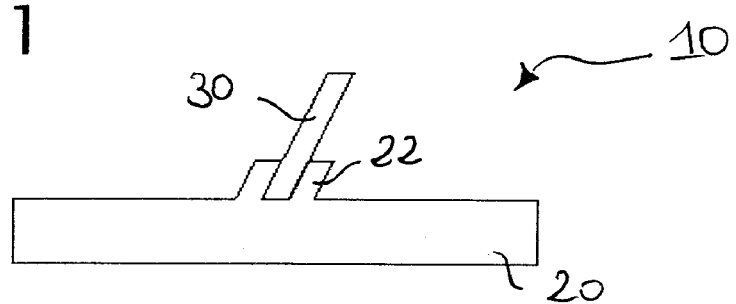
FIGS. 1 and 2 are a side view and a plan view, respectively, of one embodiment of a wave-motion reducing structure according to the present invention.
Figure 2:
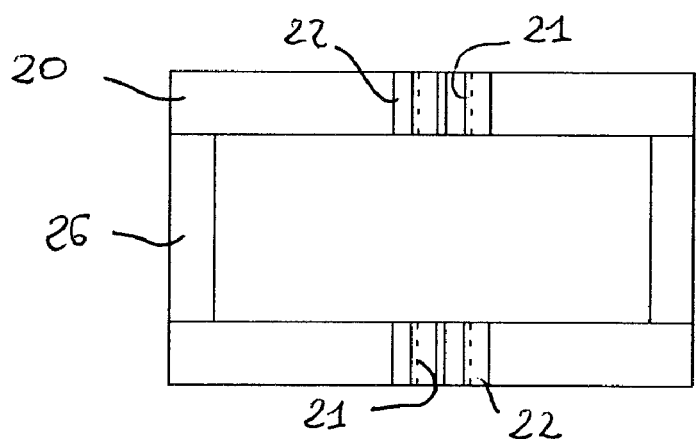
Figure 3:
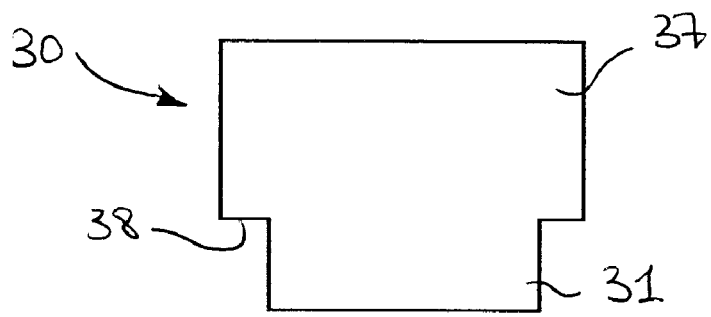
FIG. 3 is a front view of a panel of the structure shown in FIGS. 1 and 2.

According to a preferred embodiment of the present invention shown in FIGS. 1 to 3, the restraining means comprise a base suitable for being laid on or fixed to a coastal bed. The base comprises a pair of longitudinal elements 20, for example, of elongate parallelepipedal shape, arranged parallel to one another and interconnected by transverse elements 26 so as to form a structure of overall rectangular shape in plan. Each longitudinal element 20 comprises, on its upper surface, two parallel projecting walls 22 which are inclined to the vertical, defining a seat 21. The seat 21 is particularly suitable for housing the panel 30 in use so as to restrain it on the base.

The panel 30 which, for example, is substantially parallelepipedal in shape, comprises a lower portion, for example a foot 31, which can be fitted in the seat 21 in complementary manner, and an upper portion 37 which bears on the insides of the seats 21 in use, by means of respective lower shoulders 38, thus achieving a firm restraint. The panel 30 is preferably but not necessarily arranged so as to be inclined against the direction of the sea current which strikes it, preferably at an angle of between 30° and 90° to the horizontal, more preferably 45° or 60°.

According to a particularly advantageous embodiment of the present invention, the longitudinal elements 20 and the transverse elements 26 which make up the base 20 are made of a material, for example, reinforced concrete, which is heavy enough to restrain the structure on the bed and sufficiently resistant to the erosion that is caused by the wave motion over time.

According to another preferred embodiment of the present invention, the wave-motion reducing means directly comprise restraining means for enabling them to be engaged on the sea bed. The wave-motion reducing structure thus does not include a base that is laid on the coastal bed since the wave-motion reducing means are restrained on the bed directly. By way of non-limiting example, the panel 30 comprises a lower portion 31 which can be inserted directly into a sandy bed so as in any case to achieve a firm restraint.

Naturally, the composition and configuration of the elements forming the base of the structure may vary widely with respect to those described above, without thereby departing from the scope of the present invention. By way of non-limiting example, the base may comprise three or more longitudinal elements 20 or, alternatively, may not include transverse elements 26, or may even comprise a single substantially parallelepipedal base block in which the seats 21 housing the inclined panels 30 are formed, as described and illustrated above.

One of the advantages of the present invention is that it is possible to construct different configurations of the restraining means which in any case achieve greater stability on the coastal bed on which they operate without a simultaneous excessive increase in their weight, so that transportation and laying are easy and do not require the use of special tools for the purpose.

Figure 4:
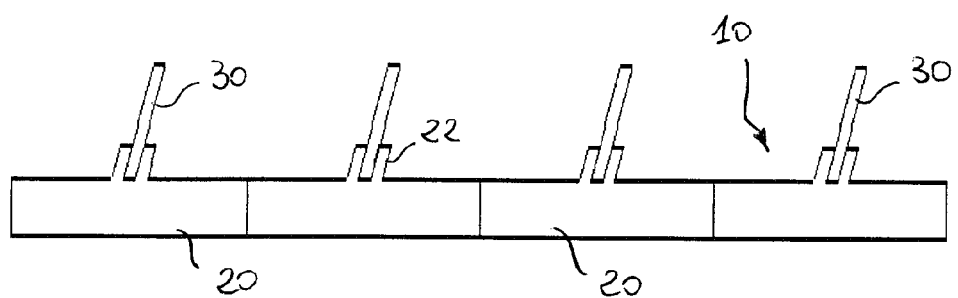
FIG. 4 is a side view of a wave-motion reducing system according to the present invention.

FIG. 4 shows a wave-motion reducing system according to the invention. It is composed of a plurality of wave-motion reducing structures 10 as described above, preferably four structures with their bases 20 arranged in a row lengthwise and in a manner such that the respective panels 30 adopt a substantially parallel configuration and oppose the wave motion of the sea current. The structures 10 are in turn placed side by side so that several panels are arranged side by side to form a continuous panel, or the structures 10 are constituted by bases housing panels which, preferably but in non-limiting manner, reach a length of between 15 and 25 meters, in particular 20 meters. Tests have found that the bases preferably have a length of 6 meters in the direction of the wave motion and the panels have a height of 1.5 meters and are inclined at 45°. The system is preferably laid on a bed having a depth of about 3 meters.

In regions in which the structures configured as explained above might give rise to erosion, the system advantageously comprises anti-erosion filter means, for example, but in non-limiting manner, made of geo-textile material weighted with a metal mesh which is preferably plastics-coated. Naturally, the filter means may be made of different known elements, for example, of ballasted mats which may help to restrain the structure on the sea bed.

Figure 5:
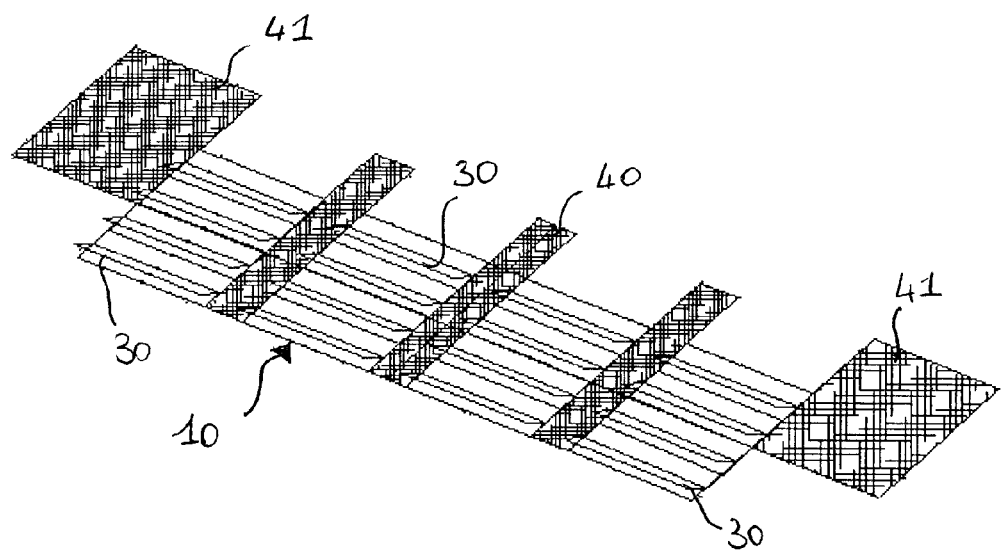
FIG. 5 is a top elevational view of a particular configuration of the wave-motion reducing system according to the present invention, comprising ballasted filter mats.

A particularly advantageous configuration of the wave-motion reducing system is shown in FIG. 5 in which ballasted filter mats 40 alternate, in the direction transverse the wave motion, with wave-motion reducing structures configured as described above. The system is preferably configured with the filter mats forming, between the structures, corridors having a width of about 6 meters and a length, in the direction of the wave motion, which is comparable to the overall length of the structures. Moreover, the wave-motion reducing system preferably extends for a distance of about 100 meters transversely relative to the wave motion and also has, at the edges of the wave-motion reducing structures 10, further filter mats 41 of a width comparable to that of the structures 10. Tests have shown that this particular configuration of the wave-motion reducing system considerably reduces erosion and eliminates any currents that may also pose a risk to bathers.

Naturally many variants of the wave-motion reducing structure and system of the invention may be provided without thereby departing from the scope of the present invention.

The invention claimed is:

1. A wave-motion reducing system comprising a plurality of structures, each structure having a base disposed on a coastal bed and a panel, the base comprising elements for engagement with the panel, the structures being arranged to form a row lengthwise such that the panels adopt a configuration substantially parallel to one another and oppose the wave motion of a sea current, a plurality of rows of said structures being arranged side by side, with respective said panels arranged side by side to form a plurality of continuous panels.

2. A wave-motion system according to claim 1, further comprising filter means.

3. A wave-motion system according to claim 2, wherein the filter means alternate with the row of wave-motion reducing structures in a direction transverse to the wave motion.

4. A wave-motion system according to claim 3, wherein the filter means comprise geo-textile material ballasted with a metal mesh which is plastics-coated.

5. A wave-motion system according to claim 4, further comprising filter means arranged at edges of the rows of wave-motion reducing structures.

6. A wave-motion system according to claim 5, wherein the filter means have a width of about 6 meters when the filter means alternate with the wave-motion reducing structures and a width comparable to that of the wave-motion reducing structures when the filter means are arranged at the edges of the wave-motion reducing structures, the system extending for about 100 meters in a direction transverse to the wave motion.

7. A wave-motion system according to claim 1, further comprising two parallel projecting walls on the base, the walls being inclined to the vertical, the walls together defining a seat which houses one of said panels in use.

8. A wave-motion system according to claim 1, wherein the base comprises a plurality of longitudinal blocks arranged parallel to one another and interconnected by transverse elements.

9. A wave-motion system according to claim 1, wherein the panel comprises an upper portion and a lower portion, the lower portion being restrained on the coastal bed.

10. A wave-motion system according to claim 9, wherein the panel is restrained on the coastal bed so as to be arranged at an inclination of between 30° and 90° to the horizontal.

11. A wave-motion system according to claim 10, wherein the panel is restrained on the coastal bed so as to be arranged at an inclination of 45° to the horizontal.

12. A wave-motion system according to claim 10, wherein the panel is restrained on the coastal bed so as to be arranged at an inclination of 60° to the horizontal.

13. A wave-motion system according to claim 1, wherein the base is constituted by a single block of material.

14. A method of constructing a wave-motion reducing system, comprising the steps of:
   providing a plurality of wave-motion reducing means, each wave-motion reducing means comprising a base and a panel,
   arranging the wave-motion reducing means in a row lengthwise such that the respective panels adopt a substantially parallel configuration and oppose the wave-motion of a sea current, and
   arranging a plurality of said rows side by side with respective panels of each row arranged side by side with one another to form a plurality of continuous panels.

* * * * *